(12) United States Patent
Bailey et al.

(10) Patent No.: US 8,028,432 B2
(45) Date of Patent: Oct. 4, 2011

(54) MOUNTING DEVICE FOR A COORDINATE MEASURING MACHINE

(75) Inventors: Brent Bailey, Winter Springs, FL (US); David M. Danielson, Sorrento, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/006,490

(22) Filed: Jan. 14, 2011

(65) Prior Publication Data

US 2011/0173823 A1 Jul. 21, 2011

Related U.S. Application Data

(60) Provisional application No. 61/296,555, filed on Jan. 20, 2010.

(51) Int. Cl.
*G01B 5/004* (2006.01)
(52) U.S. Cl. .......................................... 33/503; 33/1 PT
(58) Field of Classification Search .................... 33/503, 33/502, 504, 1 M, 1 PT
See application file for complete search history.

(56) References Cited

U.S. PATENT DOCUMENTS

| | | | |
|---|---|---|---|
| 5,189,797 A | 3/1993 | Granger | |
| 5,289,264 A | 2/1994 | Steinbichler | |
| 5,402,582 A | 4/1995 | Raab | |
| 5,510,977 A | 4/1996 | Raab | |
| 5,528,505 A | 6/1996 | Granger et al. | |
| 5,535,524 A | 7/1996 | Carrier et al. | |
| 5,752,112 A | 5/1998 | Paddock et al. | |
| 5,768,792 A | 6/1998 | Raab | |
| 5,829,148 A | 11/1998 | Eaton | |
| 5,832,416 A | 11/1998 | Anderson | |
| 5,926,782 A | 7/1999 | Raab | |
| 5,956,857 A | 9/1999 | Raab | |
| 5,978,748 A | 11/1999 | Raab | |
| D423,534 S | 4/2000 | Raab et al. | |
| 6,131,299 A | 10/2000 | Raab et al. | |
| 6,151,789 A | 11/2000 | Raab et al. | |
| 6,166,504 A | 12/2000 | Iida et al. | |
| 6,166,811 A | 12/2000 | Long et al. | |
| 6,219,928 B1 | 4/2001 | Raab et al. | |
| D441,632 S | 5/2001 | Raab et al. | |

(Continued)

FOREIGN PATENT DOCUMENTS

DE 202005000983 U1 4/2005

(Continued)

OTHER PUBLICATIONS

Information on Electro-Optical Information Systems; EOIS 3D Mini-Moire C.M.M. Sensor for Non-Contact Measuring & Surface Mapping; Direct Dimensions, Jun. 1995.

(Continued)

*Primary Examiner* — Yaritza Guadalupe
(74) *Attorney, Agent, or Firm* — Cantor Colburn LLP

(57) ABSTRACT

A mounting device for portable articulated arm coordinate measuring machine is provided. The mounting device includes a body having an opening therethrough. A lip is disposed on one side of the opening, the lip is sized to engage a flange on a base portion of the coordinate measurement machine. A portion of the opening includes a thread configured to couple with an external mounting fixture. A first arm is coupled to the body and arranged to rotate in a first direction between a first position and a second position.

31 Claims, 12 Drawing Sheets

U.S. PATENT DOCUMENTS

| | | | |
|---|---|---|---|
| 6,253,458 B1 | 7/2001 | Raab et al. | |
| 6,438,856 B1 | 8/2002 | Kaczynski | |
| 6,519,860 B1 | 2/2003 | Bieg et al. | |
| D472,824 S | 4/2003 | Raab et al. | |
| 6,598,306 B2 | 7/2003 | Eaton | |
| 6,611,346 B2 | 8/2003 | Granger | |
| 6,611,617 B1 | 8/2003 | Crampton | |
| 6,612,044 B2 | 9/2003 | Raab et al. | |
| 6,668,466 B1 | 12/2003 | Bieg et al. | |
| D491,210 S | 6/2004 | Raab et al. | |
| 6,868,359 B2 | 3/2005 | Raab | |
| 6,879,933 B2 | 4/2005 | Steffey et al. | |
| 6,892,465 B2 | 5/2005 | Raab et al. | |
| 6,931,745 B2 | 8/2005 | Granger | |
| 7,006,084 B1 | 2/2006 | Buss et al. | |
| 7,024,032 B2 | 4/2006 | Kidd et al. | |
| 7,032,321 B2* | 4/2006 | Raab et al. | 33/503 |
| 7,152,456 B2 | 12/2006 | Eaton | |
| 7,174,651 B2* | 2/2007 | Raab et al. | 33/503 |
| 7,184,047 B1 | 2/2007 | Crampton | |
| 7,191,541 B1 | 3/2007 | Weekers et al. | |
| 7,249,421 B2 | 7/2007 | MacManus et al. | |
| 7,269,910 B2* | 9/2007 | Raab et al. | 33/503 |
| 7,296,979 B2 | 11/2007 | Raab et al. | |
| 7,313,264 B2 | 12/2007 | Crampton | |
| 7,383,638 B2 | 6/2008 | Granger | |
| 7,395,606 B2 | 6/2008 | Crampton | |
| 7,525,276 B2 | 4/2009 | Eaton | |
| 7,545,517 B2 | 6/2009 | Rueb et al. | |
| 7,546,689 B2 | 6/2009 | Ferrari et al. | |
| D599,226 S | 9/2009 | Gerent et al. | |
| 7,591,077 B2 | 9/2009 | Pettersson | |
| 7,591,078 B2 | 9/2009 | Crampton | |
| 7,604,207 B2 | 10/2009 | Hasloecher et al. | |
| 7,614,157 B2 | 11/2009 | Granger | |
| 7,624,510 B2 | 12/2009 | Ferrari | |
| D607,350 S | 1/2010 | Cooduvalli et al. | |
| 7,693,325 B2 | 4/2010 | Pulla et al. | |
| 7,712,224 B2 | 5/2010 | Hicks | |
| 7,743,524 B2 | 6/2010 | Eaton et al. | |
| 7,752,003 B2 | 7/2010 | MacManus | |
| 7,765,707 B2 | 8/2010 | Tomelleri | |
| 7,779,548 B2 | 8/2010 | Ferrari | |
| 7,779,553 B2 | 8/2010 | Jordil et al. | |
| 7,804,602 B2 | 9/2010 | Raab | |
| 7,805,854 B2 | 10/2010 | Eaton | |
| RE42,055 E* | 1/2011 | Raab et al. | 33/503 |
| RE42,082 E* | 2/2011 | Raab et al. | 33/503 |
| 7,881,896 B2 | 2/2011 | Atwell et al. | |
| 2003/0053037 A1 | 3/2003 | Blaesing-Bangert et al. | |
| 2003/0167647 A1* | 9/2003 | Raab et al. | 33/503 |
| 2003/0172536 A1* | 9/2003 | Raab et al. | 33/503 |
| 2003/0172537 A1* | 9/2003 | Raab et al. | 33/503 |
| 2003/0208919 A1* | 11/2003 | Raab et al. | 33/503 |
| 2003/0221326 A1* | 12/2003 | Raab et al. | 33/503 |
| 2004/0040166 A1* | 3/2004 | Raab et al. | 33/503 |
| 2004/0103547 A1* | 6/2004 | Raab et al. | 33/503 |
| 2004/0111908 A1* | 6/2004 | Raab et al. | 33/503 |
| 2004/0162700 A1 | 8/2004 | Rosenberg et al. | |
| 2005/0016008 A1* | 1/2005 | Raab et al. | 33/503 |
| 2005/0028393 A1* | 2/2005 | Raab et al. | 33/503 |
| 2005/0115092 A1* | 6/2005 | Raab et al. | 33/503 |
| 2005/0144799 A1* | 7/2005 | Raab et al. | 33/503 |
| 2005/0188557 A1* | 9/2005 | Raab et al. | 33/503 |
| 2005/0283989 A1 | 12/2005 | Pettersson | |
| 2006/0016086 A1* | 1/2006 | Raab et al. | 33/503 |
| 2006/0026851 A1* | 2/2006 | Raab et al. | 33/503 |
| 2006/0028203 A1 | 2/2006 | Kawashima et al. | |
| 2006/0053647 A1* | 3/2006 | Raab et al. | 33/503 |
| 2006/0096108 A1* | 5/2006 | Raab et al. | 33/503 |
| 2006/0123649 A1 | 6/2006 | Muller | |
| 2006/0169050 A1 | 8/2006 | Kobayashi et al. | |
| 2006/0291970 A1 | 12/2006 | Granger | |
| 2007/0043526 A1 | 2/2007 | De Jonge et al. | |
| 2007/0058162 A1 | 3/2007 | Granger | |
| 2007/0097382 A1 | 5/2007 | Granger | |
| 2007/0105238 A1 | 5/2007 | Mandl et al. | |
| 2008/0052936 A1 | 3/2008 | Briggs et al. | |
| 2008/0148585 A1 | 6/2008 | Raab et al. | |
| 2008/0196260 A1 | 8/2008 | Petterson | |
| 2008/0235969 A1 | 10/2008 | Jordil et al. | |
| 2008/0252671 A1 | 10/2008 | Cannell et al. | |
| 2008/0256814 A1 | 10/2008 | Pettersson | |
| 2008/0257023 A1 | 10/2008 | Jordil et al. | |
| 2008/0271332 A1 | 11/2008 | Jordil et al. | |
| 2008/0282564 A1 | 11/2008 | Pettersson | |
| 2008/0295349 A1* | 12/2008 | Uhl et al. | 33/503 |
| 2009/0031575 A1 | 2/2009 | Tomelleri | |
| 2009/0083985 A1 | 4/2009 | Ferrari | |
| 2009/0139105 A1 | 6/2009 | Granger | |
| 2009/0177435 A1 | 7/2009 | Heininen | |
| 2009/0177438 A1 | 7/2009 | Raab | |
| 2009/0241360 A1 | 10/2009 | Tait et al. | |
| 2009/0249634 A1 | 10/2009 | Pettersson | |
| 2009/0265946 A1 | 10/2009 | Jordil et al. | |
| 2010/0057392 A1 | 3/2010 | York | |
| 2010/0078866 A1 | 4/2010 | Pettersson | |
| 2010/0095542 A1 | 4/2010 | Ferrari | |
| 2010/0208062 A1 | 8/2010 | Pettersson | |
| 2010/0281705 A1 | 11/2010 | Verdi et al. | |
| 2010/0286941 A1 | 11/2010 | Merlot | |
| 2010/0325907 A1 | 12/2010 | Tait | |
| 2011/0007326 A1 | 1/2011 | Daxauer et al. | |
| 2011/0013199 A1 | 1/2011 | Siercks et al. | |

FOREIGN PATENT DOCUMENTS

| | | |
|---|---|---|
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005036929 B4 | 6/2010 |
| DE | 102008062763 B3 | 7/2010 |
| EP | 0767357 B1 | 5/2002 |
| EP | 1361414 A1 | 11/2003 |
| EP | 1669713 A1 | 6/2006 |
| EP | 1429109 B1 | 4/2007 |
| EP | 1764579 B1 | 12/2007 |
| EP | 2023077 A1 | 2/2009 |
| EP | 2068067 A1 | 6/2009 |
| FR | 2935043 A1 | 2/2010 |
| GB | 2341203 A | 3/2000 |
| JP | 7210586 A | 8/1995 |
| JP | 2004257927 A | 9/2004 |
| JP | 2006301991 A | 11/2006 |
| WO | 9208568 A1 | 5/1992 |
| WO | 9910706 A1 | 3/1999 |
| WO | 02101323 A2 | 12/2002 |
| WO | 2004096502 A1 | 11/2004 |
| WO | 2005100908 A1 | 10/2005 |
| WO | 2006051264 A1 | 5/2006 |
| WO | 2007125081 A1 | 11/2007 |
| WO | 2007144906 A1 | 12/2007 |
| WO | 1878543 A2 | 1/2008 |
| WO | 2008075170 A1 | 6/2008 |
| WO | 2009001165 A1 | 12/2008 |
| WO | 2009016185 A1 | 2/2009 |
| WO | 2009130169 A1 | 10/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |
| WO | 2011000955 A1 | 1/2011 |

OTHER PUBLICATIONS

Romer "Romer Absolute Arm Product Brochure" (2010); Hexagon Metrology; www.hexagonmetrology.com; Hexagon AB 2010.

Romer "Romer Absolute Arm Maximum Performance Portable Measurement" (Printed Oct. 2010); Hexagon Metrology, Inc. http://us:ROMER.com; Hexagon Metrology, Inc 2010.

International Search Report mailed Apr. 21, 2011 for International Application No. PCT/US2011021249 filed Jan. 14, 2011.

Written Opinion of the International Searching Authority mailed Apr. 21, 2011 for International Application No. PCT/US2011021249 filed Jan. 14, 2011.

* cited by examiner

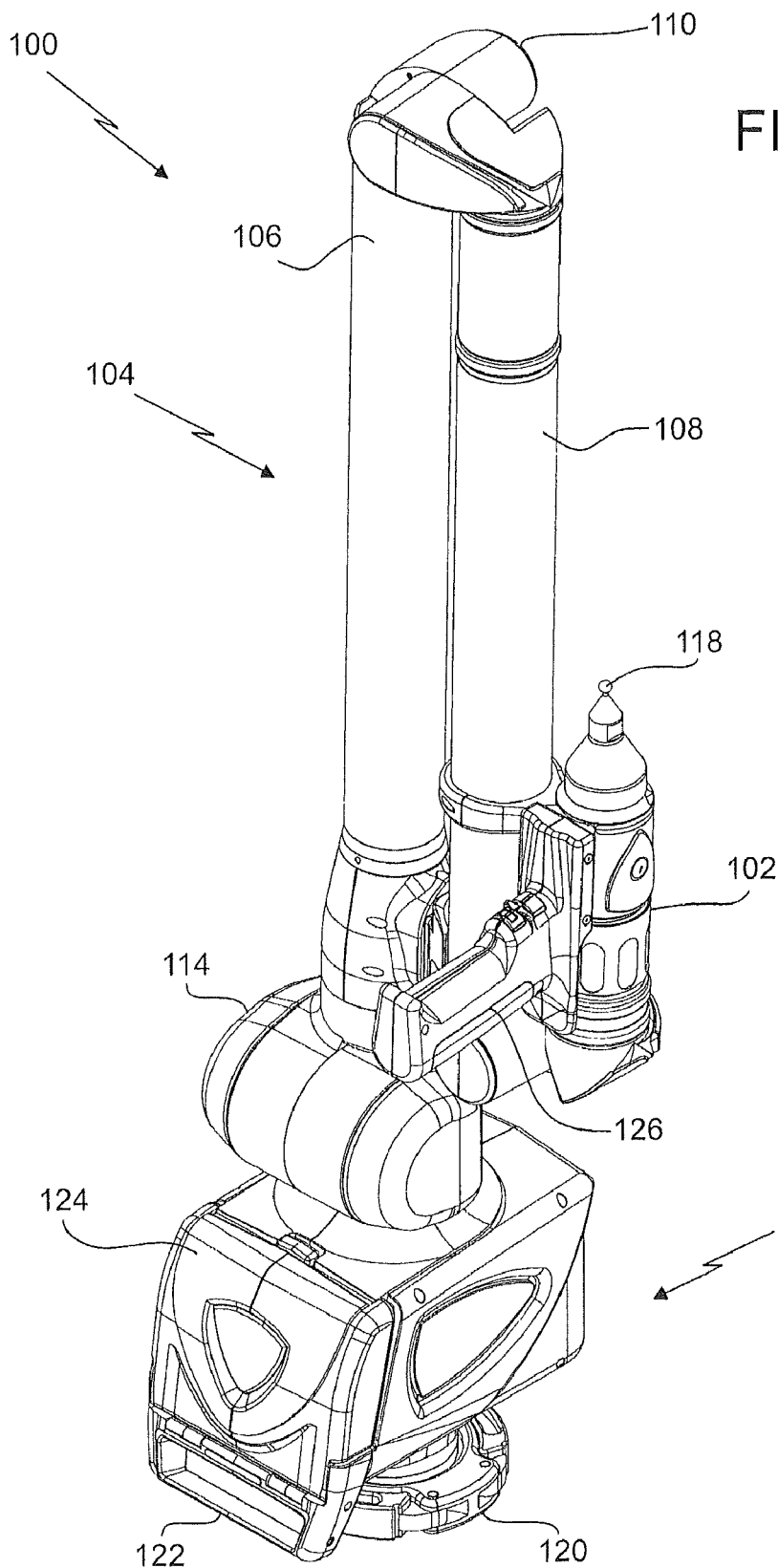

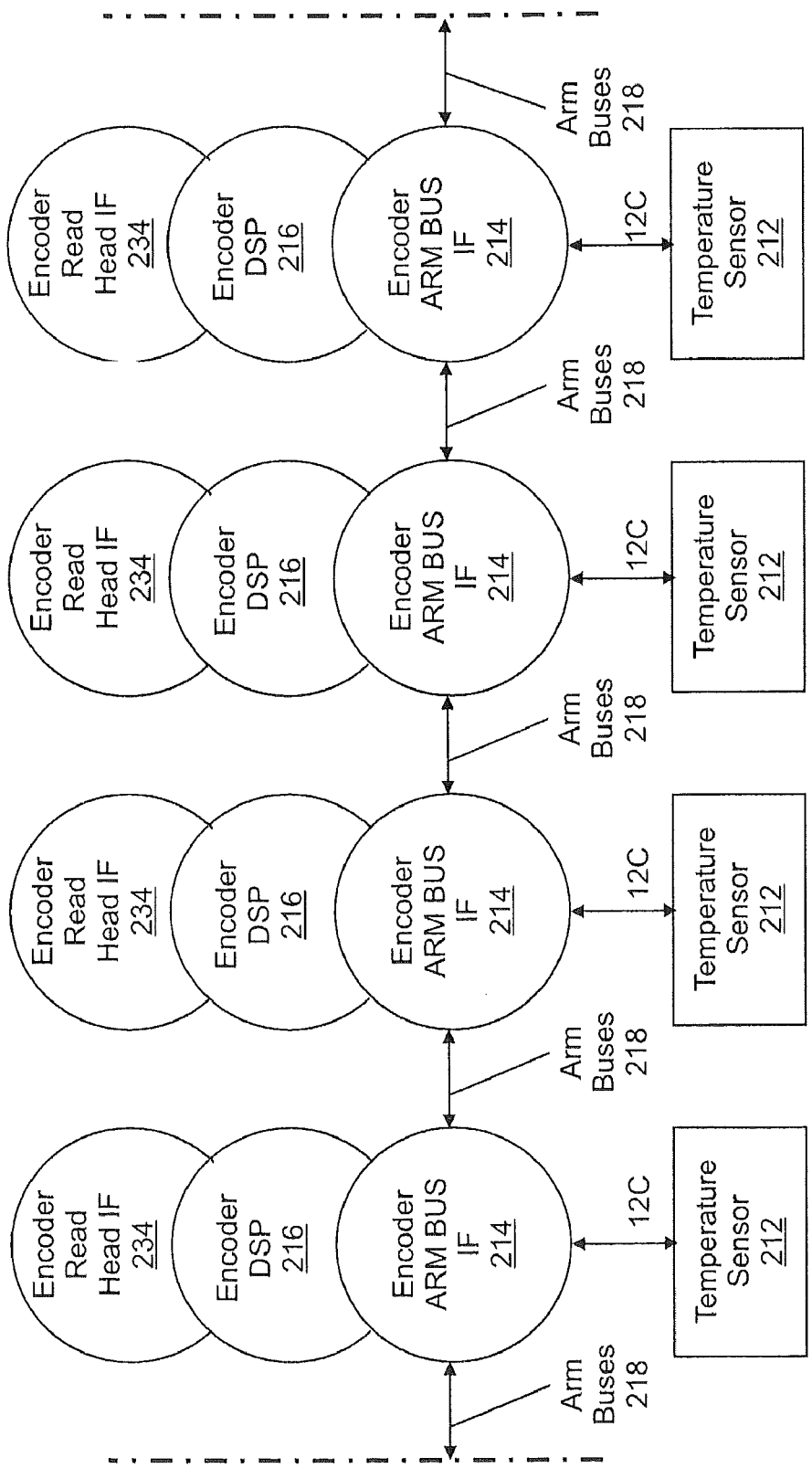

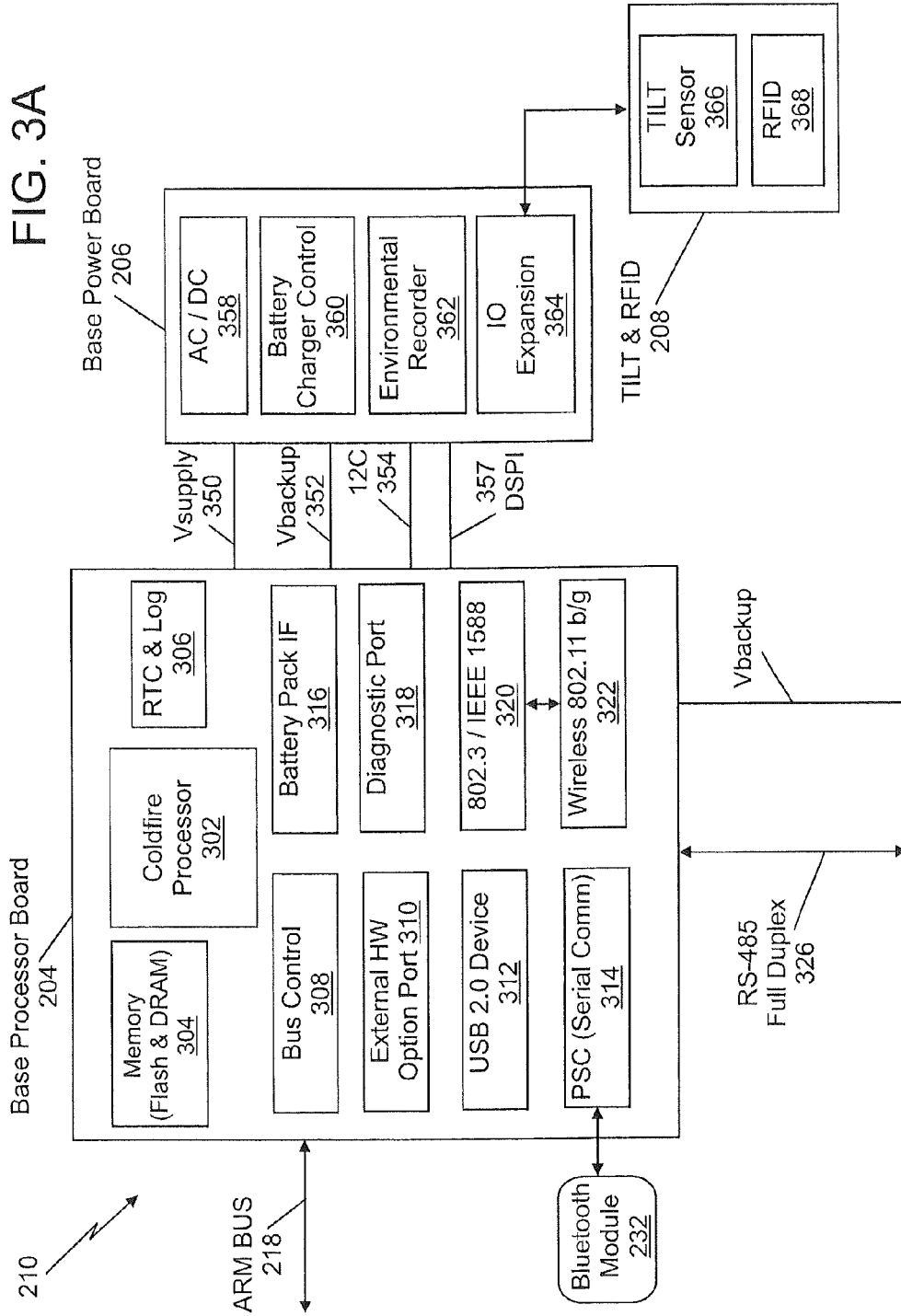

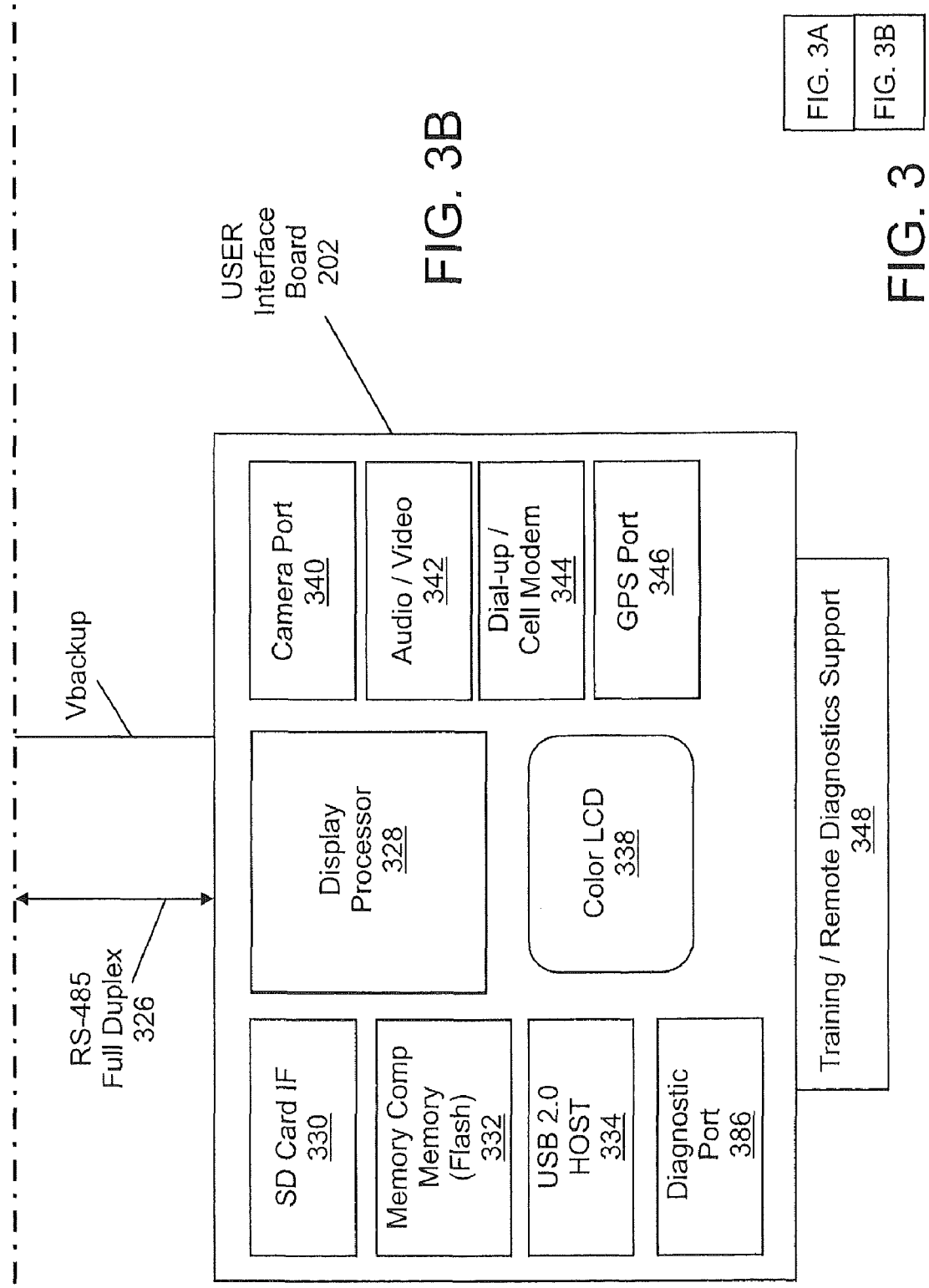

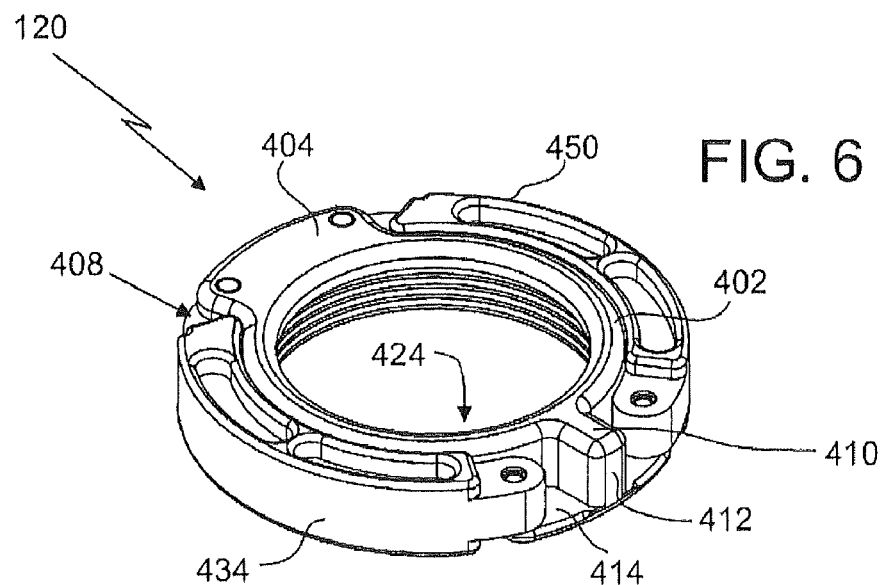
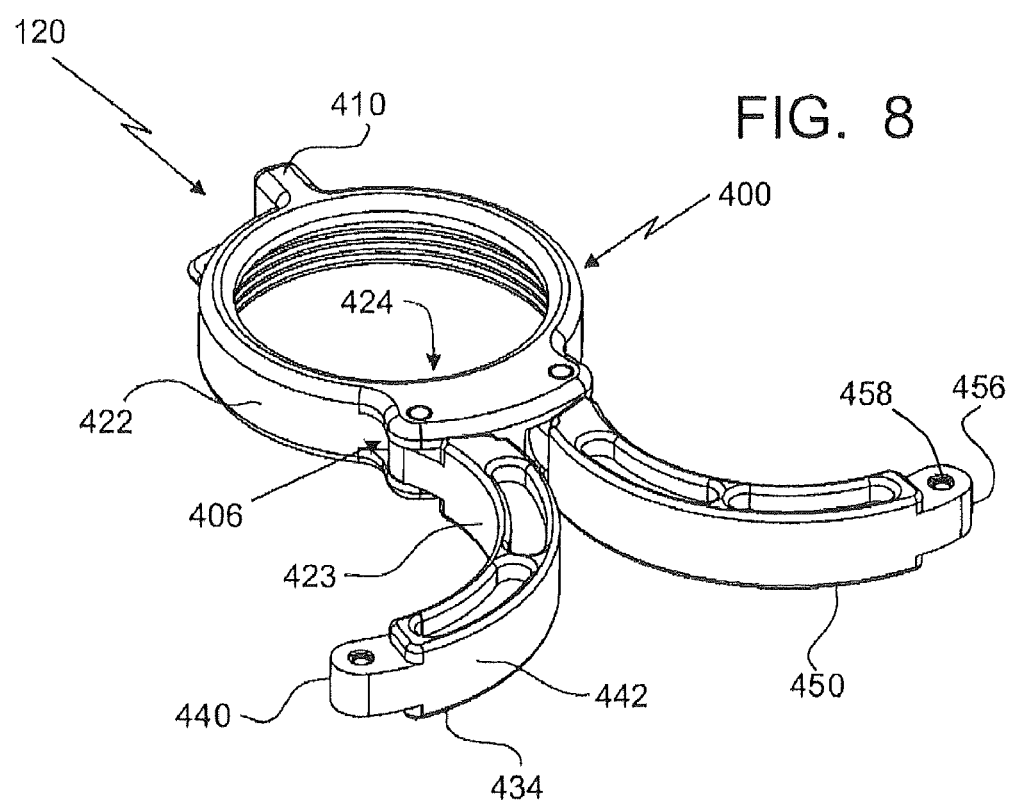

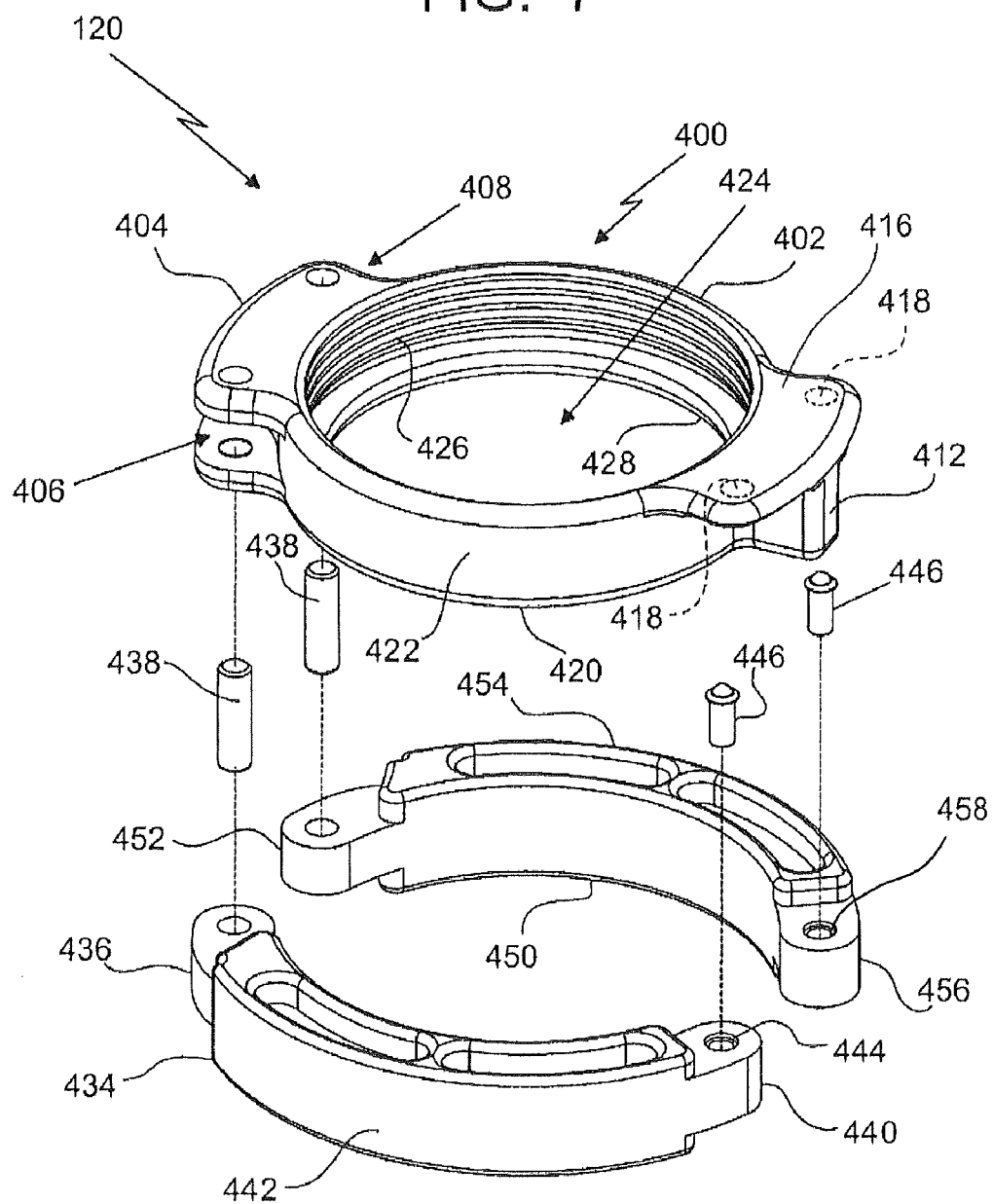

MOUNTING DEVICE FOR A COORDINATE MEASURING MACHINE

CROSS-REFERENCE TO RELATED APPLICATIONS

The present application claims the benefit of provisional application No. 61/296,555 filed Jan. 20, 2010, the content of which is hereby incorporated by reference in its entirety.

BACKGROUND

The present disclosure relates to a coordinate measuring machine, and more particularly to a portable articulated arm coordinate measuring machine having a mounting device that facilitates the installation and removal of the coordinate measuring machine.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable AACMM is disclosed in commonly assigned U.S. Pat. No. 5,402,582 ('582), which is incorporated herein by reference in its entirety. The '582 patent discloses a 3-D measuring system comprised of a manually-operated AACMM having a support base on one end and a measurement probe at the other end. Commonly assigned U.S. Pat. No. 5,611,147 ('147), which is incorporated herein by reference in its entirety, discloses a similar AACMM. In the '147 patent, the AACMM includes a number of features including an additional rotational axis at the probe end, thereby providing for an arm with either a two-two-two or a two-two-three axis configuration (the latter case being a seven axis arm).

While existing AACMM's are suitable for their intended purposes there remains a need for improvements. What is needed is a portable AACMM that has a retaining device that allows the AACMM to be installed and removed from a desired location without requiring the use of tools.

SUMMARY OF THE INVENTION

In accordance with one embodiment of the invention, a portable articulated arm coordinate measuring machine (AACMM) for measuring coordinates of an object in space is provided. The AACMM includes a manually positionable articulated arm portion having an opposed first end and second end, the arm portion including a plurality of connected arm segments, each arm segment including at least one position transducer for producing a position signal. A measurement device is attached to the first end. An electronic circuit is provided which receives the position signal from the at least one position transducer and provides data corresponding to a position of the measurement device. A base is rotationally coupled to the second end, the base having a flange on one side. A mounting device is provided that includes a body having a first opening there through with a lip disposed on one side, the lip being sized to engage the flange, a portion of the first opening having a thread. A first arm is rotationally coupled to the body and arranged to rotate in a first direction between a first position and a second position.

In accordance with another embodiment of the invention, another AACMM is provided. The AACMM includes a manually positionable articulated arm portion having an opposed first end and second end, the arm portion including a plurality of connected arm segments, each arm segment including at least one position transducer for producing a position signal. A measurement device is attached to the first end. An electronic circuit is provided which receives the position signal from the at least one position transducer and provides data corresponding to a position of the measurement device. A mounting device is operably coupled to the second end. The mounting device includes a body having a first central portion with an opening extending therethrough, the opening having a fastener portion, a first projection extending from a first side of the first central portion, the first projection having a first slot and a second slot. A first arm is rotationally coupled to the first slot on a third end, the first arm having a fourth end movable between a first position adjacent the first central portion and a second position distal from the first central portion.

In accordance with yet another embodiment of the invention, another AACMM is provided. The AACMM having a manually positionable articulated arm portion having an opposed first end and second end, the arm portion including a plurality of connected arm segments, each arm segment including at least one position transducer for producing a position signal. A measurement device is attached to a first end of the AACMM. An electronic circuit is provided which receives the position signal from the at least one transducer and provides data corresponding to a position of the measurement device. A base is rotationally coupled to the second end. A mounting device is provided having a retainer member coupled to the base, the retainer member having a flange disposed about a circumference. A body having a first central portion with an opening extending there through. The body is arranged with at least a portion of the retainer member being disposed within the opening, the opening having a lip disposed to engage the flange. A first arm is rotationally coupled to the body on a third end, the first arm having a fourth end movable between a first position adjacent the first central portion and a second position distal from the first central portion.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including FIGS. 1A and 1B, are perspective views of a portable articulated arm coordinate measuring machine (AACMM) having embodiments of various aspects of the present invention therewithin;

FIG. 3, including FIGS. 3A and 3B taken together, is a block diagram describing detailed features of the electronic data processing system of FIG. 2 in accordance with an embodiment;

FIG. 6 is a top perspective view of the mounting ring of FIG. 4;

FIG. 7 is an exploded bottom perspective view of the mounting ring of FIG. 4;

FIG. 8 is a top perspective view of the mounting ring of FIG. 4 with the arms in a second position; and, FIG. 9 is a partial cross sectional view of the mounting ring of FIG. 4 installed on the AACMM of FIG. 1.

DETAILED DESCRIPTION

It is desirable for a portable AACMM to be easily and quickly transported, installed and removed by operators from point of use locations. Embodiments of the present invention include advantage in incorporating a retaining device in a base member. The retaining device provides advantages in allowing the AACMM to be coupled and decoupled from a point of use location without the use of tools. Embodiments of the invention include a retaining device with movable integrated arms that extend to allowing installation and removal of the AACMM and retract during operation and storage.

Figure 1A:
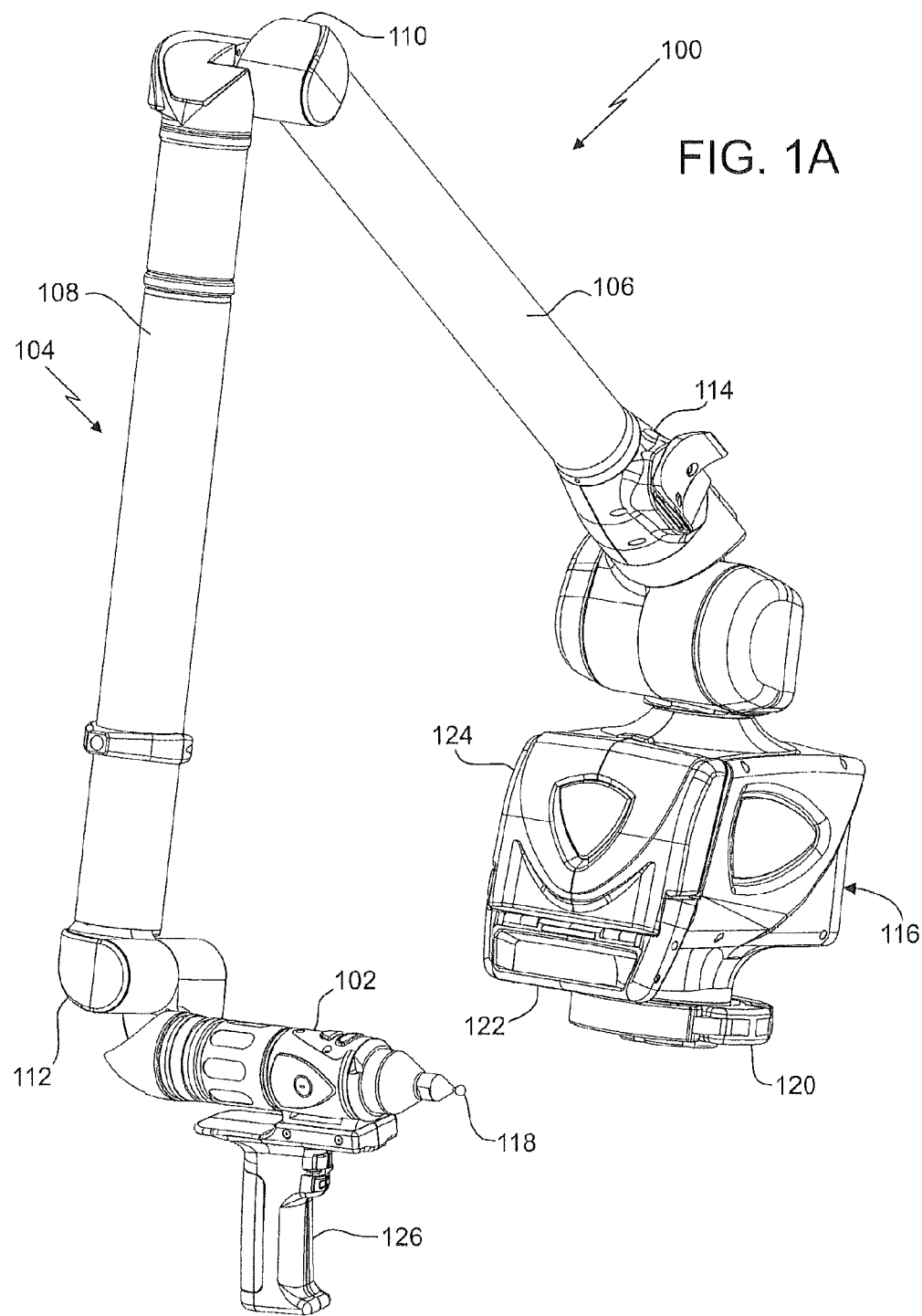

FIGS. 1A and 1B illustrate, in perspective, a portable articulated arm coordinate measuring machine (AACMM) 100 according to various embodiments of the present invention, an articulated arm being one type of coordinate measuring machine. As shown in FIGS. 1A and 1B, the exemplary AACMM 100 may comprise a six or seven axis articulated measurement device having a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the measurement probe housing 102 may comprise the shaft of the seventh axis portion of the AACMM 100 (e.g., a cartridge containing an encoder system that determines movement of the measurement device, for example a probe 118, in the seventh axis of the AACMM 100). In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
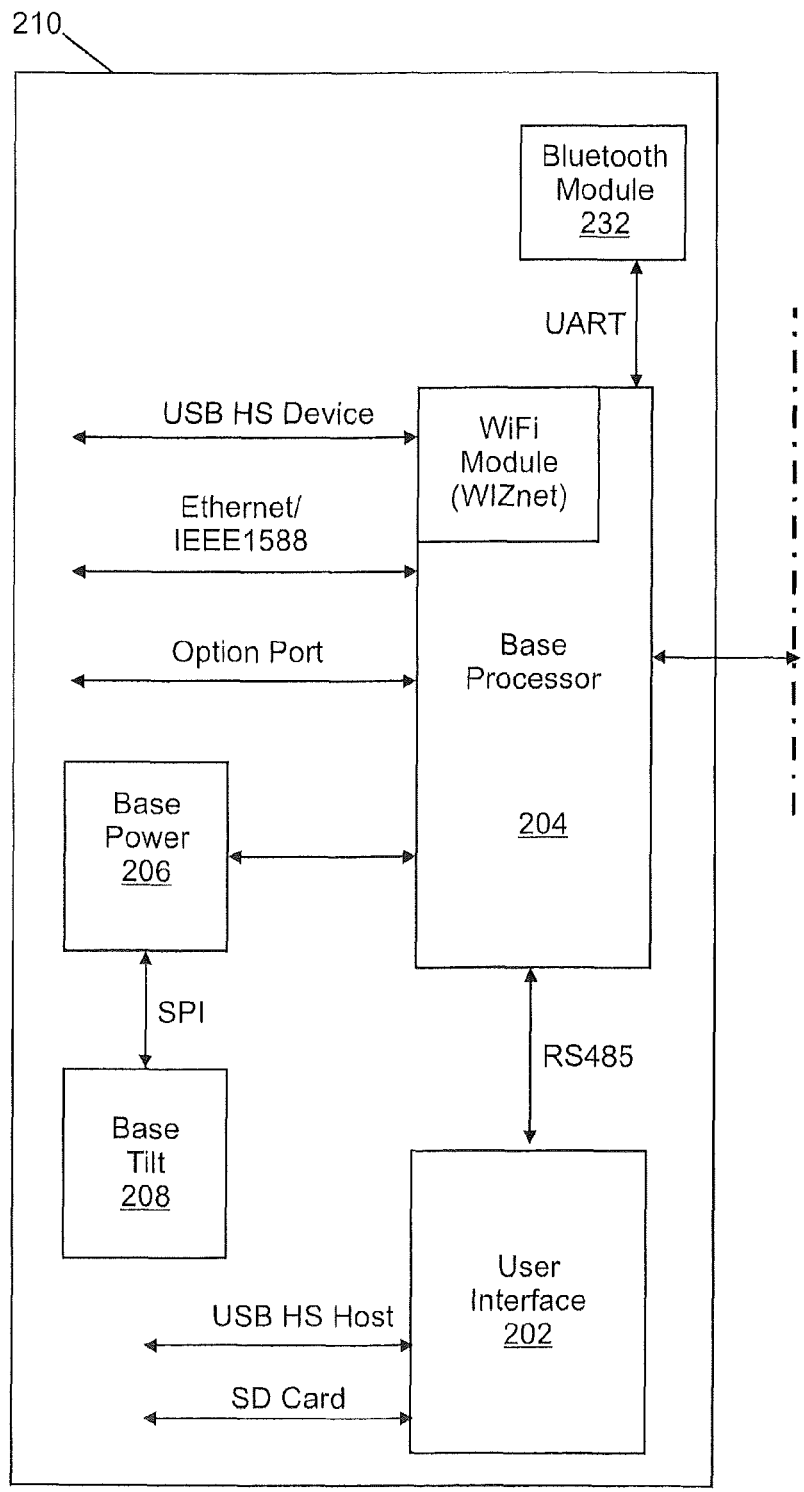
FIG. 2, including FIGS. 2A-2D taken together, is a block diagram of electronics utilized as part of the AACMM of FIG. 1 in accordance with an embodiment.
Figure 2C:
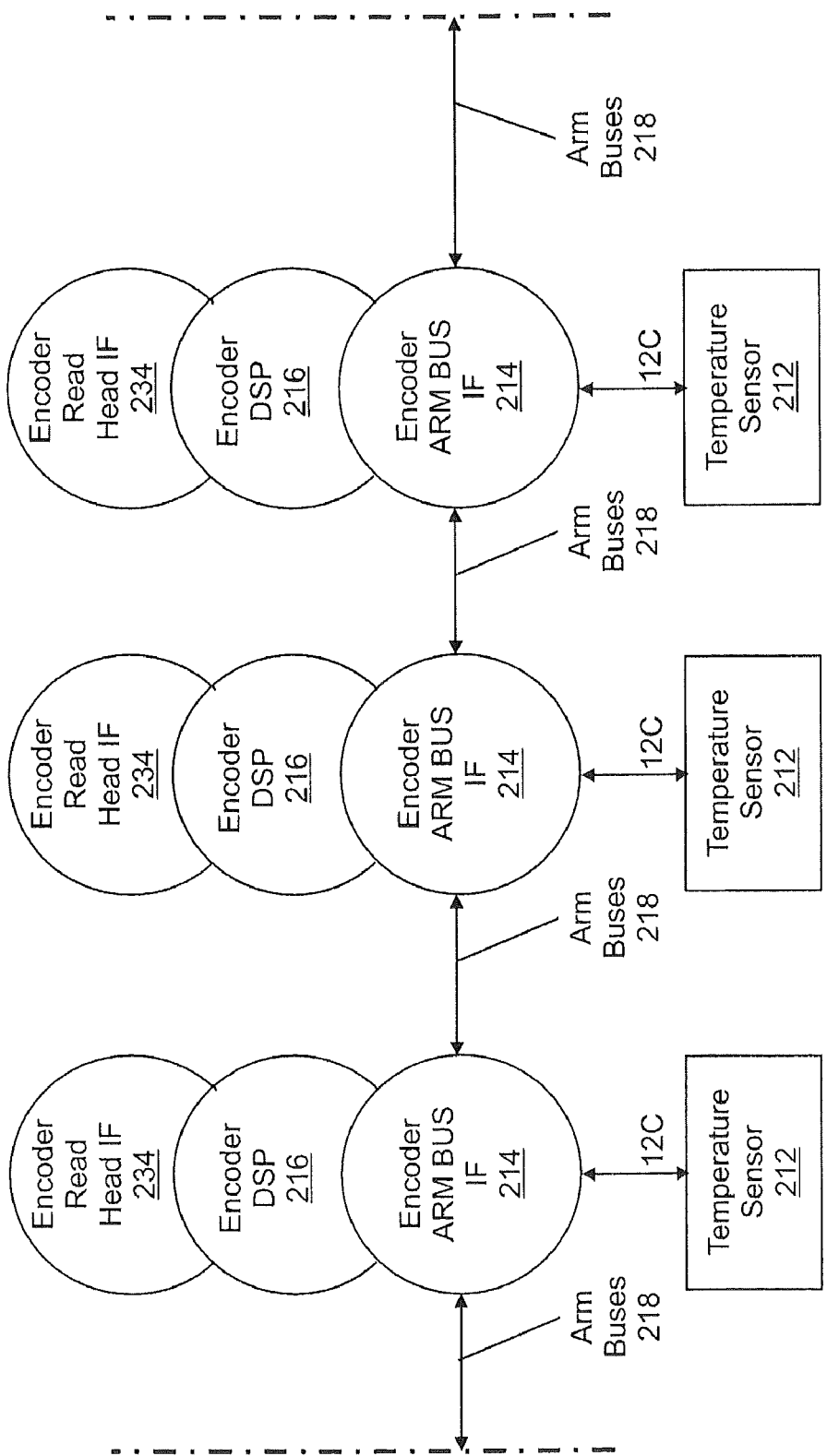
Figure 2D:
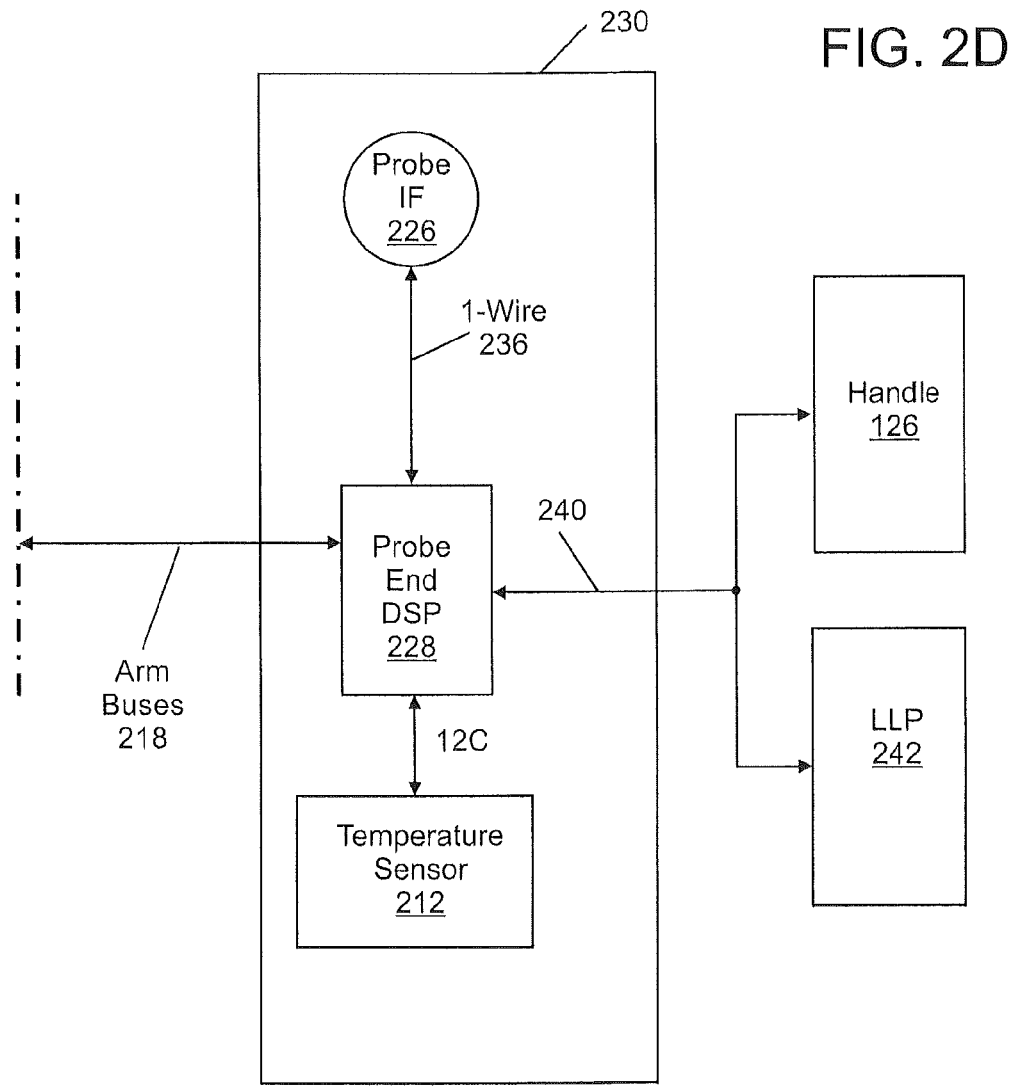
Figure 2:
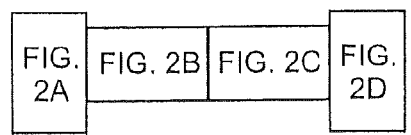
Figure 4:
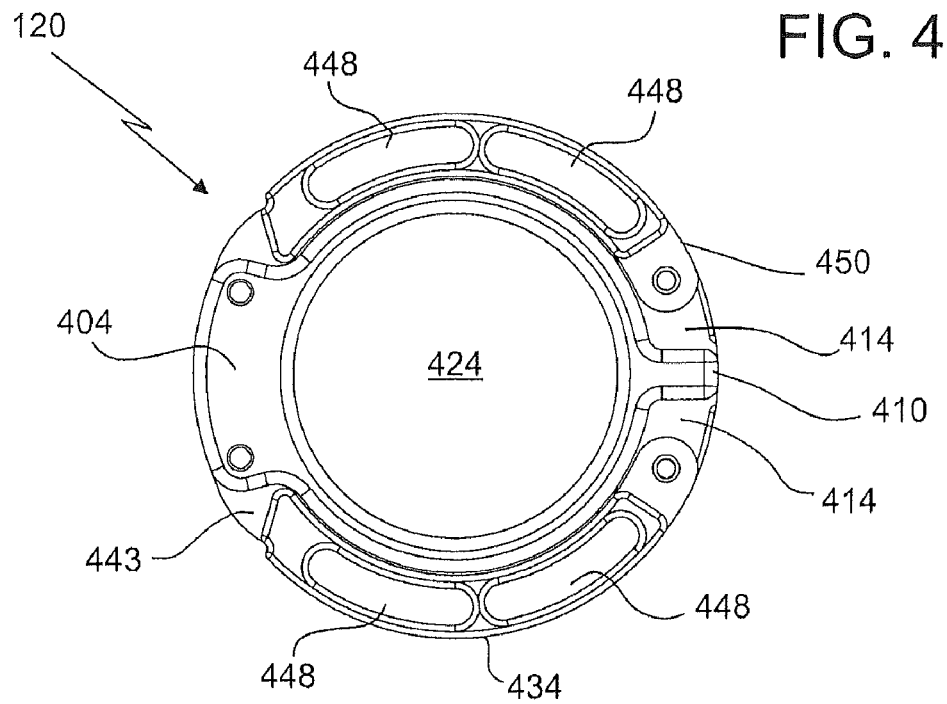
FIG. 4 is a top plan view of a mounting ring for the AACMM of FIG. 1.
Figure 5:
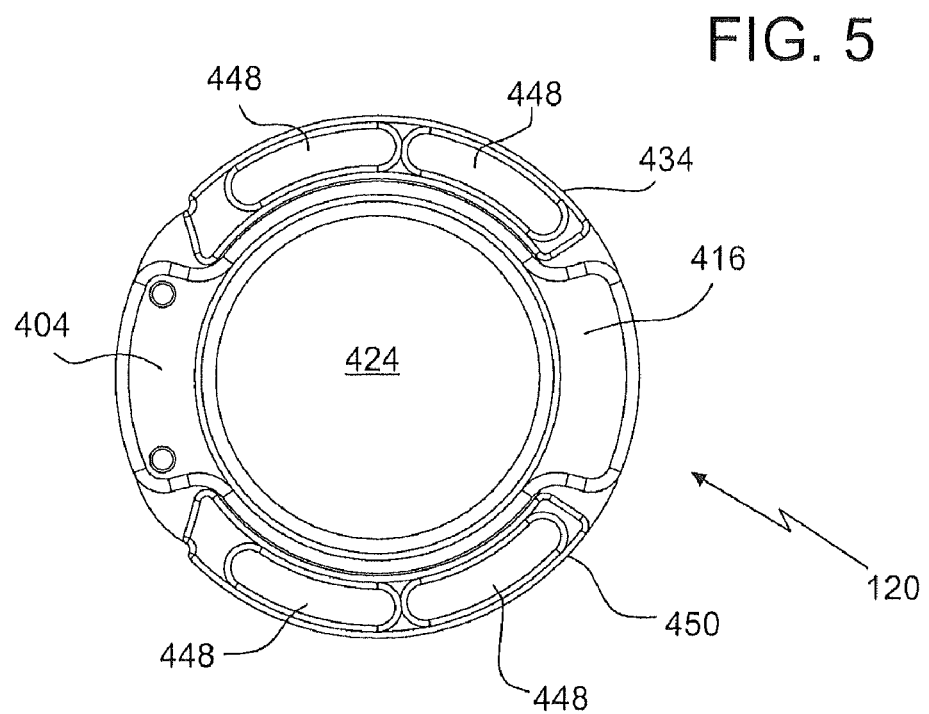
FIG. 5 is a bottom plan view of the mounting ring of FIG. 4.

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Referring to FIGS. 4-9 an embodiment of the mounting device 120 is shown. In the exemplary embodiment, the mounting device 120 has a body 400 with a central portion 402. A first projection 404 extends from one side of the central portion 402. The first projection 404 includes a first slot 406 and a second slot 408. A second projection 410 extends from the central portion 402 opposite the first projection 404. The second projection 410 includes a wall 412 that divides a planar surface 414. In the exemplary embodiment, the planar surface 414 extends from one side 416 of the body 400 and includes a pair of recesses 418.

The central portion 402 includes a substantially cylindrical wall 420 having an outer surface 422. The wall 420 defines an opening 424 that extends through the body 400. The wall 420 has a threaded portion 426 on an inside diameter. The threaded portion 426 is adapted to cooperate with a threaded member on an attachment device (not shown) such as the magnetic mounting device described in commonly-owned U.S. Pat. No. 6,904,691 entitled "Portable Coordinate Measurement Machine with Improved Counter Balance" which is incorporated herein by reference. Typically, the attachment device may be any suitable attachment device such as a 3½ inch diameter threaded ring mounted on an inspection table, a machining device (e.g., lathe or vertical mill) or a tripod for example that rigidly couples the AACMM 100 to a desired location. On one end of opening 424, the body has a lip 428. The lip 428 is sized to cooperate with a flange 430 on a retaining member 432 (FIG. 9) to couple the AACMM to the attachment device as will be discussed in more detail below.

In the exemplary embodiment, the mounting device 120 further includes a first arm 434 having a first end 436 disposed within the first slot 406 and coupled to the body 400 by a retaining pin 438. The retaining pin 438 is fabricated from a suitable material having sufficient strength to support the first arm 434 during use. The first arm 434 further includes a second end 440 opposite the first end 436 and a central portion 442 disposed there between. The second end 440 includes an opening 444 sized to receive a fastener 446 such as a detent mechanism for example. In the exemplary embodiment, the first end 436 has a thickness sized to be received within the first slot 406 and is thinner than the thickness of the central portion 442. Similarly, the second end 440 has offset sides such that the second end 440 is thinner than the central portion 442. The offset of the sides on the second end 440 is sized to allow the second end 440 to be adjacent the surface 414 when the first arm 434 is in a retracted or first position. It should be appreciated that the offset of the surfaces on the ends 436, 440 provides the first arm 434 with a substantially equal thickness to the body 400 such that the mounting device 120 has a generally cylindrical or ring-like shape. Further, the curved outer surfaces of the first arm 434, second arm, 450, first projection 404 and second projection 410 are positioned at substantially the same radius.

In the exemplary embodiment, the central portion 442 includes openings 448 on a top and bottom surface. The openings 448 provide advantages in reducing the weight of the first arm 434 and provide the operator with an area to grasp when moving the first arm 434. An end of the central portion 442 has a surface 443 that is angled to allow the first arm 434 to be fully opened to a second position (FIG. 8) without the edge of the central portion 442 interfering with the body 400. The first arm 434 has an inner surface 423 with a curvature with a radius substantially similar to the radius of the outer surface 422. When the first arm 434 is in the retracted or first position, the inner surface 423 conforms with or is in contact with the outer surface 422.

The mounting device 120 further includes a second arm 450 that is substantially a mirror image of the first arm 434. The second arm 450 includes a third end 452 disposed within and coupled to the second slot 408 by a retaining pin 438. The second arm 450 has a curvature and a central portion 454. A fourth end 456 is arranged distal to the third end 452. The fourth end 456 includes an opening 458 sized to receive a fastener 446, such as a detent mechanism for example.

The first arm 434 may rotate between a retracted or first position (FIGS. 4-6) and an extended or second position (FIG. 8). The rotation of the first arm 434 to the second position provides a handle for the operator that facilitates the rotation of the mounting device 120 in the counter-clockwise direction. In one embodiment, when the first arm 434 is rotated to the second position, the outer surface of first end 436 engages the inner wall of slot 406 creating a mechanical advantage that transfers the force applied by the operator to the central portion 402. Similarly, the second arm 450 may be rotated between a retracted or third position (FIGS. 4-6) and an extended or fourth position (FIG. 8). The rotation of the second arm 450 to the fourth position provides a handle for the operator that facilitates the rotation of the mounting device 120 in the clockwise direction. In one embodiment, the rotation of the second arm 450 to the extended position causes the outer surface of third end 452 to engage the inner wall of slot 408 creating a mechanical advantage that transfers the force applied by the operator to the central portion 402. When the mounting device 120 is installed on the base 116 (FIG. 9), the rotation of the mounting device 120 will allow the threaded portion 426 to engage an attachment device (not shown) and mount the AACMM 100 to a fixed location. Rotation of the mounting device 120 in the counter-clockwise direction allows the threaded portion 426 to disengage from an attachment device allowing the AACMM 100 to be removed.

Figure 9:
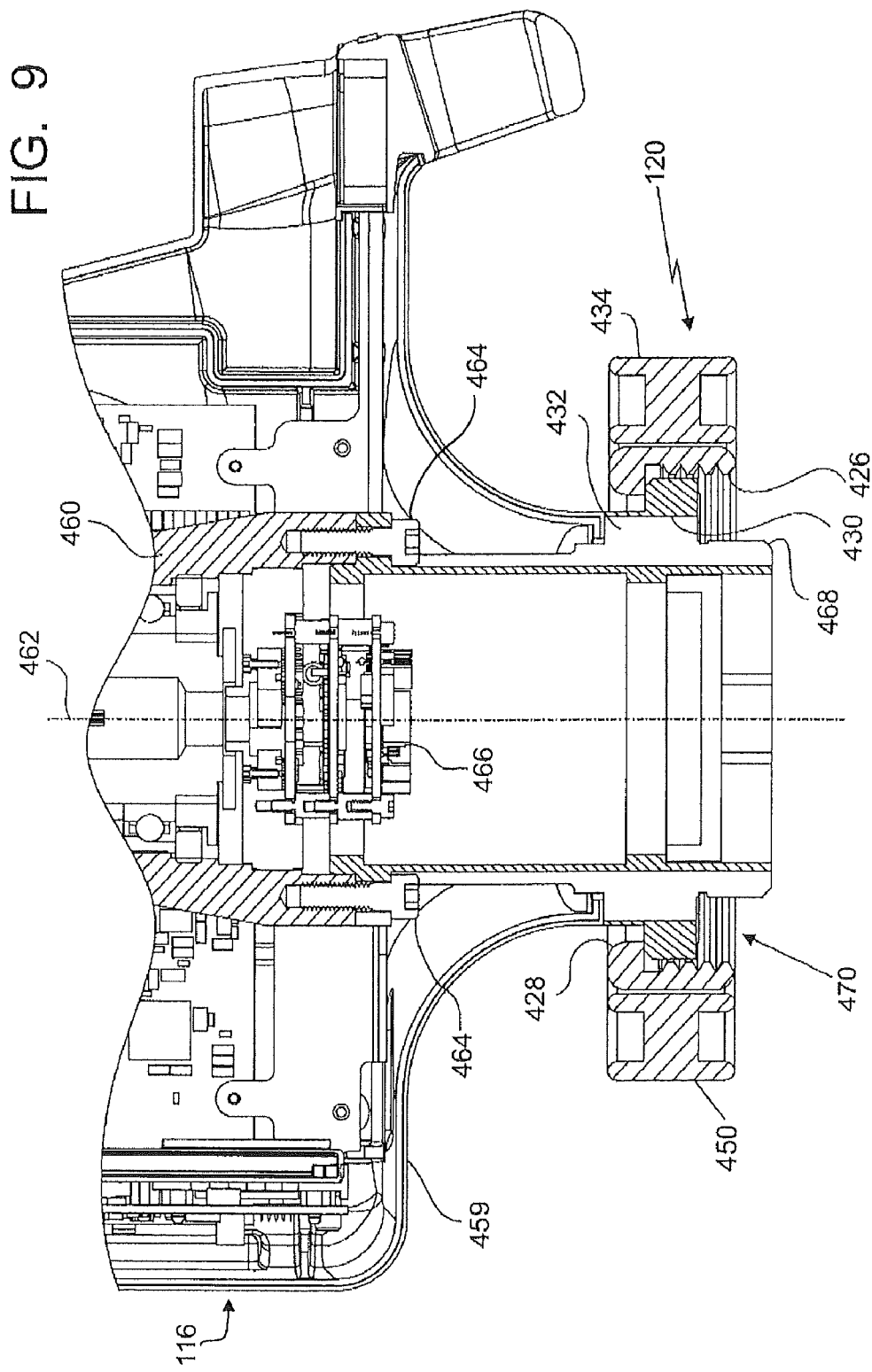

Referring to FIG. 9, in the exemplary embodiment the mounting device 120 is coupled to the base 116 of AACMM 100. The base includes a housing 459 that contains the electrical and mechanical components that support the operation of the AACMM 100. In one embodiment, the base 116 includes a base member 460 that supports the first arm segment 106 for rotation about an axis 462. A retaining member 432 is coupled to the base member 460 by a plurality of bolts 464. An optical encoder 466 may be disposed between the retaining member 432 and base member 460 for measuring the rotation of the first arm segment 106. The retaining member 432 includes a flange 430 adjacent a cylindrical portion 468. The diameter of cylindrical portion 468 is smaller than the inner diameter of body 400 to define a gap 470 between the cylindrical portion 468 and the threaded portion 426. As discussed above, the flange 430 has a diameter sized to cooperate with the lip 428 of the mounting device 120. The gap 470 allows the threaded portion 426 to engage corresponding threads on an attachment device without interference from the retaining member. When the threaded portion 426 is so engaged, the rotation of the mounting device 120 in the clockwise direction causes the lip 428 to contact the flange 430.

The force resulting from the lip 428 on the flange 430 results in the retaining member 432 (and the AACMM 100) being clamped against the attachment device.

It should be appreciated that it is desirable for the AACMM 100 to be firmly coupled to the attachment device to avoid inducing errors in the measurements taken by the operator. To facilitate this coupling, the operator may rotate the second arm 450 to the extended position. The second arm 450 provides leverage that increases the torque the operator may apply to the mounting device 120. This provides advantages in allowing the operator to firmly couple the AACMM 100 without resorting to separate tools. Once the AACMM 100 is coupled to a desired location, to the second arm 450 may be rotated back to the third position to not interfere with the operator's use of the AACMM 100.

When the AACMM 100 needs to be moved to a new location, the operator rotates the first arm 434 to the second position and uses the leverage provided by the first arm 434 to rotate the mounting device 120 in the counter-clockwise direction and decouple the mounting device 120 from the attachment device. Again, this process may be performed by the operator without having to resort to separate tools. It should be appreciated that providing a mounting device 120 that allows the AACMM 100 to be installed and removed without tools saves the operator time, money and provides a higher reliability that the AACMM 100 is properly installed. Previous mounting devices for AACMM's included wings, tabs, knurls and grips for example, that are inadequate for metrology applications. The mounting device 120 of the present invention provides advantages in that the first arm 424 and second arm 450 provide a mechanical advantage that greatly exceeds that provided by previous devices allowing the operator to properly install the AACMM without needing separate tools.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A portable articulated arm coordinate measuring machine (AACMM) for measuring coordinates of an object in space, comprising:
   a manually positionable articulated arm portion having an opposed first end and second end, the arm portion including a plurality of connected arm segments, each arm segment including at least one position transducer for producing a position signal;
   a measurement device attached to the first end;
   an electronic circuit which receives the position signal from the at least one position transducer and provides data corresponding to a position of the measurement device;
   a base rotatably coupled to the second end, the base having a flange on one side;
   a mounting device including: a body having a first opening therethrough with a lip disposed on one side, the lip being sized to engage the flange, a portion of the first opening having a thread; and
   a first arm rotationally coupled to the body and arranged to rotate in a first direction between a first position and a second position.

2. The AACMM of claim 1 further comprising a second arm rotationally coupled to the body and arranged to rotate in a second direction between a third position and a fourth position.

3. The AACMM of claim 2 further comprising a first fastener coupled to a third end of the first arm and a second fastener coupled to a fourth end of the second arm.

4. The AACMM of claim 3 wherein the first fastener removably couples the third end to the body, and the second fastener removably couples the fourth end to the body.

5. The AACMM of claim 4 wherein the first fastener includes a first detent mechanism and the second fastener includes a second detent mechanism.

6. The AACMM of claim 3 wherein the first arm is rotationally coupled to the body on a fifth end opposite the second end, and the second arm is rotationally coupled to the body on a sixth end opposite the fourth end.

7. The AACMM of claim 6 wherein the first arm includes a second opening and a third opening, and the second arm includes a fourth opening and a fifth opening.

8. The AACMM of claim 2 wherein:
   the thread has an axis of rotation;
   at least one of the first arm or the second arm is configured to develop torque about the axis of rotation; and
   the torque develops a force sufficient to hold the base rigidly fixed to an attachment device.

9. The AACMM of claim 8 wherein the body is operably coupled to the base.

10. The AACMM of claim 8 wherein the body is operably coupled to the attachment device.

11. A portable articulated arm coordinate measuring machine (AACMM) for measuring coordinates of an object in space, comprising:
    a manually positionable articulated arm portion having an opposed first end and second end, the arm portion including a plurality of connected arm segments, each arm segment including at least one position transducer for producing a position signal;
    a measurement device attached to the first end;
    an electronic circuit which receives the position signal from the at least one position transducer and provides data corresponding to a position of the measurement device;
    a mounting device operably coupled to the second end, the mounting device including:
    a body having a first central portion with an opening extending therethrough, the opening having a fastener portion, a first projection extending from a first side of the first central portion, the first projection having a first slot and a second slot; and
    a first arm rotationally coupled to the first slot on a third end, the first arm having a fourth end movable between a first position adjacent the first central portion and a second position distal from the first central portion.

12. The AACMM of claim 11 further comprising:
    a second arm rotationally coupled to the second slot on a fifth end, the second arm having a sixth end movable between a third position adjacent the first central portion and a fourth position distal from the first central portion.

13. The AACMM of claim 12 further comprising:
a first fastener coupled to the fifth end and a second fastener coupled to the sixth end; and
wherein the body first includes a second projection extending from a second side of the first central portion, the second projection having a first recess disposed to cooperate with the first fastener and a second recess disposed to cooperate with the second fastener.

14. The AACMM of claim 13 wherein the first fastener is a first detent mechanism and the second fastener is a second detent mechanism.

15. The AACMM of claim 12 wherein:
the first central portion includes a first surface having a first curvature and a second surface having a second curvature, the first surface and the second surface being arranged opposite the opening;
the first arm includes a third surface adjacent the first surface, the third surface being substantially in contact with the first surface when the first arm is in the first position; and
the second arm includes a fourth surface adjacent the second surface, the fourth surface being substantially in contact with the second surface when the second arm is in the third position.

16. The AACMM of claim 15 wherein:
the first arm includes a fifth surface opposite the third surface;
the second arm includes a sixth surface opposite fourth surface;
the first projection includes a seventh surface opposite the opening; and
the fifth surface, the sixth surface and the seventh surface are disposed at substantially the same radius.

17. The AACMM of claim 16 wherein:
the first arm includes a second central portion and a third projection disposed within the first slot; and
the second arm includes a third central portion and a fourth projection disposed within the second slot.

18. The AACMM of claim 17 further comprising a lip disposed within the opening adjacent the first side.

19. The AACMM of claim 12 wherein:
the mounting device is coupled to a base, the base being disposed between the mounting device and the second end;
the fastener portion includes a thread having an axis of rotation;
at least one of the first arm or the second arm is configured to develop torque about the axis of rotation;
the torque develops a force sufficient to hold the base rigidly fixed to an attachment device.

20. The AACMM of claim 19 wherein the body is operably coupled to the base.

21. The AACMM of claim 19 wherein the body is operably coupled to the attachment device.

22. A portable articulated arm coordinate measuring machine (AACMM) for measuring coordinates of an object in space, comprising:
a manually positionable articulated arm portion having an opposed first end and second end, the arm portion including a plurality of connected arm segments, each arm segment including at least one position transducer for producing a position signal;
a measurement device attached to a first end of the AACMM;
an electronic circuit which receives the position signal from the at least one transducer and provides data corresponding to a position of the measurement device;
a base rotatably coupled to the second end; and
a mounting device including:
a retainer member coupled to the base, the retainer member having a flange disposed about a circumference;
a body having a first central portion with an opening extending therethrough, at least a portion of the retainer member being disposed within the opening, the opening having a lip disposed to engage the flange; and
a first arm rotationally coupled to the body on a third end, the first arm having a fourth end movable between a first position adjacent the first central portion and a second position distal from the first central portion.

23. The AACMM of claim 22 further comprising a second arm rotationally coupled to the body on a fifth end, the second arm having a sixth end movable between a third position adjacent the first central portion and a fourth position distal from the first central portion.

24. The AACMM of claim 23 wherein the first central portion includes a first projection extending from one side of the first central portion, the first projection having a first slot sized to receive the third end and a second slot sized to receive the fifth end.

25. The AACMM of claim 24 wherein the first central portion includes a second projection extending substantially opposite the first projection, the fourth end being disposed adjacent the second projection in the first position and the sixth end being disposed adjacent the second projection in the third position.

26. The AACMM of claim 25 further comprising:
a first fastener coupled to the fourth end, the first fastener removably coupled to the second projection when in the first position; and
a second fastener coupled to the sixth end, the second fastener removably coupled to the second projection when in the third position.

27. The AACMM of claim 26 wherein the opening includes a threaded portion adjacent the lip.

28. The AACMM of claim 27 wherein:
the first arm includes a second central portion having at least one first recess; and
the second arm includes a third central portion having at least one second recess.

29. The AACMM of claim 23 wherein:
the opening includes a thread having an axis of rotation;
at least one of the first arm or the second arm is configured to develop torque about the axis of rotation.
the torque develops a force sufficient to hold the base rigidly fixed to an attachment device.

30. The AACMM of claim 29 wherein the body is operably coupled to the base.

31. The AACMM of claim 29 wherein the body is operably coupled to the attachment device.

* * * * *